United States Patent [19]

Navin et al.

[11] 4,422,996
[45] Dec. 27, 1983

[54] METHOD FOR MAKING COATED MOLDED ARTICLES

[75] Inventors: Robert F. Navin; James R. Prom, both of Port Washington, Wis.

[73] Assignee: Freeman Chemical Corporation, Port Washington, Wis.

[21] Appl. No.: 338,272

[22] Filed: Jan. 11, 1982

Related U.S. Application Data

[63] Continuation of Ser. No. 145,800, May 1, 1980, abandoned.

[51] Int. Cl.$^3$ .............................................. B29G 7/00
[52] U.S. Cl. ................................. 264/255; 264/250; 428/423.7; 525/920; 525/922
[58] Field of Search .............. 264/255, 250; 525/920, 525/922; 428/423.7

[56] References Cited

U.S. PATENT DOCUMENTS

| | | | |
|---|---|---|---|
| 3,297,745 | 1/1967 | Fekete et al. | 525/90 |
| 4,034,017 | 7/1977 | Chang | 525/920 |
| 4,081,578 | 3/1978 | Van Essen | 264/255 |
| 4,235,833 | 11/1980 | Arnason | 264/255 |
| 4,239,796 | 12/1980 | Shanaski et al. | 264/255 |
| 4,242,415 | 12/1980 | Feltzin | 525/920 |
| 4,245,006 | 1/1981 | Shanaski | 264/255 |

*Primary Examiner*—James H. Derrington

[57] ABSTRACT

A method for producing coated, molded, fiber-reinforced thermoset plastic articles having an adherent coating in heated matched metal molds. The coating composition includes a polyurethane polyacrylate which is a reaction product, substantially free of unreacted —NCO radicals, of an organic diisocyanate, a hydroxy alkyl acrylate or methacrylate and an organic diol in combination with copolymerizable alpha-, beta-ethylenically unsaturated monomer. The coating composition also contains initiators for addition polymerization and may contain fillers including inert paticulate fillers, pigments, mold release agents. The coating composition is applied in the matched metal mold after a fiber-reinforced thermoset plastic article has been shaped within the mold. The coating composition is applied by opening the mold and introducing the described coating composition, thereafter closing the mold and retaining the mold in the closed condition until the plastic article is further cured and the described coating composition is cured.

6 Claims, No Drawings

METHOD FOR MAKING COATED MOLDED ARTICLES

CROSS-REFERENCES TO RELATED APPLICATIONS

This is a continuation of application Ser. No. 145,800, filed May 1, 1980, now abandoned.

BACKGROUND OF THE INVENTION

1. Field of the Invention:

The invention relates to thermoset fiber-reinforced molded articles having in-mold applied coatings.

2. Description of the Prior Art:

MATCHED METAL MOLDING—Fiber-reinforced, thermosetting resinous products are produced in elevated temperature, matched metal molds. One of the shortcomings of this process is that the molded article surface tends to be irregular and tends to have surface exposure of the reinforcing fibers, usually glass fibers.

IN-MOLD COATINGS—The in-mold coating technique has been developed to improve the quality of the surface of a molded article after the curing of the article in a matched metal mold has been substantially advanced, U.S. Pat. No. 4,081,578. In the matched metal molding process, two or more shaped mold elements cooperate to define a mold cavity. A molding composition (polymerizable thermosetting resin and fibrous reinforcing material and usually fillers, catalysts, mold release agents, and other reagents) is introduced into a mold cavity between the matched metal mold surfaces. The shaped mold elements are brought together to spread the molding composition throughout the mold cavity and to confine the molding composition until curing is essentially completed. The heated mold elements initiate polymerization. When the polymerization is well advanced, i.e., the article has assumed the shape of the mold cavity, the mold surfaces are separated slightly, usually a distance from 3 to 40 mils, and a liquid, in-mold, coating composition is injected under pressure into the mold cavity. Thereafter the mold elements are again brought together under pressure which causes the liquid coating composition to disperse over the surface of the partially cured article and to conform with the surface of the contiguous mold element. After a suitable time, the polymerization of the article is essentially completed and the polymerization of the coating composition is essentially completed. At that time the mold elements are separated and the coated, molded article is removed.

Two-component in-mold coating compositions are known, U.S. Pat. No. 4,081,578, which employ polyisocyanates as one ingredient and employ hydroxy-terminated high molecular weight unsaturated polyester resin as another ingredient. These compositions have limited pot life after being mixed and must be used promptly. These compositions have exhibited some inadequate adhesive properties.

There is a demonstrated need for a single-component coating composition which can be prepared and retained for extended periods of time by the molding operator.

SUMMARY OF THE INVENTION

According to the present invention, an in-mold coating composition is provided for thermoset fiber-reinforced plastic molded articles. The composition includes a polyurethane polyacrylate and copolymerizable ethylenically unsaturated monomer along with a polymerization initiator and fillers which may include inert particulate fillers, pigments, mold release agents. The polyurethane polyacrylate is a reaction product, substantially free of unreacted—NCO radicals of 1. an organic diisocyanate;
2. a hydroxy alkyl acrylate or methacrylate;
3. an organic diol.

DESCRIPTION OF THE PREFERRED EMBODIMENT(S)

The polyurethane polyacrylate constitutes from 0.075 to 5.0 parts by weight for each part by weight of the ethylenically unsaturated copolymerizable monomer.

THE POLYURETHANE POLYACRYLATE OR METHACRYLATE

A polyurethane polyacrylate or polymethacrylate is an oligomer which can be prepared by combining an organic diisocyanate, a hydroxy alkyl acrylate or methacrylate and an organic diol.

Organic Diisocyanate—A preferred organic diisocyanate is toluene diisocyanate (TDI). The readily available mixture of the 2,4- and 2,6- isomers of TDI is useful. Other organic diisocyanates include isophorone diisocyanate, polymethylene polyphenyl diisocyanate. In general a mixture of polyisocyanates and monoisocyanates having an—NCO equivalent of 1.8 to 2.2 is useful and can be categorized as a diisocyanate for the present purposes.

The Hydroxy Alkyl Acrylate or Methacrylate—In general these materials include hydroxy ethyl acrylate or methacrylate, hydroxy propyl acrylate or methacrylate, hydroxy butyl acrylate or methacrylate, a hydroxyl group is usually attached to the beta carbon of the alkyl radical. The alkyl radical may contain up to 8 carbon atoms.

The following structural formula describes useful hydroxy alkyl acrylates and methacrylates:

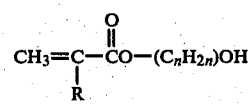

wherein
R=—H or —CH$_3$; and
n=an integer from 2 to 8.

The Organic Diol—An organic diol is employed as the core of the oligomer which comprises the polyurethane polyacrylate or methacrylate. The proportion of organic diol in the polyurethane polyacrylate influences the size of each oligomer. Useful organic diols include alkylene diols such as ethylene glycol, propylene glycol, diethylene glycol, dipropylene glycol, polyethylene glycol, polypropylene glycol, hydroxy alkyl ethers of butane diol and the like; diester diols such as the diester reaction product of dicarboxylic acid or anhydride and an organic diol as already described, for example, a diester of adipic acid and diethylene glycol is a useful organic diol for the present purposes. Alkylene oxide adducts of diester diols may be employed.

Proportions—From 0.15 to 0.5 mols of the organic diol are supplied for each mol of the hydroxy alkyl acrylate or methacrylate. The organic diisocyanate is supplied such that the NCO/OH ratio in the system is 0.9 to 1.0.

PREPARATION

The polyurethane polyacrylate or methacrylate is formed by combining the organic diol, the organic diisocyanate and the hydroxy alkyl acrylate or methacrylate in the presence of a suitable catalyst for the reaction of —NCO radicals with hydroxyl radicals, for example, a tin catalyst. A preferred procedure is to combine the organic diisocyanate with the hydroxy alkyl acrylate or methacrylate to produce a urethane product having an acrylic or methacrylic radical and an unreacted —NCO radical. That monoisocyanate is then combined with the organic diol at about 80° C. until substantially all of the —NCO radicals are reacted. The resulting oligomer is dissolved in a suitable ethylenically unsaturated copolymerizable monomer to reduce the viscosity of the mixture to a useful level. In general the polyurethane polyacrylate will comprise from about 7 to 90 percent by weight of the resinous ingredients (of the coating composition) and the copolymerizable ethylenically unsaturated monomer will comprise from about 93 to 10 percent of the resinous ingredients (of the coating composition). Thus the polyurethane polyacrylate constitutes from about 0.075 to about 5.0 parts by weight for each part by weight of the ethylenically unsaturated copolymerizable monomer.

THE COPOLYMERIZABLE MONOMER

Copolymerizable monomers include styrene, alpha methyl styrene, divinyl benzene, vinyl toluene, diallyl phthalate, acrylate or methacrylate esters such as ethyl acrylate, methyl acrylate, propyl acrylate, butyl acrylate, hexyl acrylate and the corresponding methacrylates; ethylene glycol diacrylate, ethylene glycol dimethacrylate, acrylic and methacrylic esters of diepoxides such as the acrylic or methacrylic diester of the diglycidyl ether of bisphenol-A.

OTHER INGREDIENTS

The in-mold coating composition may contain inhibitors and stabilizers to retard premature polymerization of the composition in the manner well known in the molding composition arts. A catalyst for the reaction of —NCO radicals and —OH radicals also is included, preferably a tin catalyst such as dibutyl tin dilaurate or stannous octoate. Mold release agents such as zinc stearate are included in the composition. Inert particulate fillers and opacifiers may be added along with pigments if desired. An initiator for addition polymerization of the acrylates and copolymerizable monomers is included, e.g., organic peroxide initiators.

GLASS FIBER-REINFORCED THERMOSET MOLDED ARTICLES

The molded articles customarily are fabricated from unsaturated polyester resin compositions which include
A. an unsaturated polyester resin usually formed by polyesterification of organic polyols and organic polycarboxylic acids, at least a portion of which includes ethylenically unsaturated polycarboxylic acid;
B. copolymerizable monomer for the unsaturated polyester resin, usually styrene;
C. fillers, including particulate inert fillers, catalysts for the condensation polymerization of the unsaturated polyester resin with the copolymerizable monomer;
D. mold release agents;
E. glass fiber reinforcing materials.

The molding composition is introduced into a matched metal mold at temperatures usually in the range of 300° F. The mold is closed and the molding composition is allowed to polymerize and assume the shape of the interior of the mold.

IN-MOLD COATINGS

After the molded article has at least partially polymerized and assumed the shape of the interior of the mold, the mold is opened and an in-mold coating composition is introduced. Thereafter the mold is closed once more causing the coating composition to spread over at least one surface of the molded article. The mold is retained in a closed position for a sufficient period to allow the molded article to complete further curing and to allow the coating composition to be cured as an adherent coating over at least one surface of the molded article. Thereafter the mold is opened and the thermoset glass fiber-reinforced plastic molded article is recovered having a cured, adherent coating of the present coating composition over at least one surface thereof.

EXAMPLE 1

Preparation of the Polyurethane Polyacrylate

The following ingredients were combined in a reactor:

1 mol toluene diisocyanate, a mixture of the 2,4- and 2,6- isomers;
1 mol hydroxy ethyl methacrylate;
½ mol of a difunctional polyester formed by reaction of adipic acid and diethylene glycol, said polyester having a low acid number and having a hydroxyl number from 200 to 210;
dibutyl tin dilaurate catalyst, ½ percent by weight based upon the weight of toluene diisocyanate;
500 p.p.m. a stabilizer;
200 p.p.m. an inhibitor.

Initially the toluene diisocyanate was combined with the hydroxy methyl methacrylate in the presence of the tin catalyst at about 65° C. Thereafter the polyester was added slowly to the reaction kettle at about 80° C. until substantially all of the —NCO radicals had been reacted. An in-mold coating composition was prepared from 70 parts by weight of the described polyurethane polyacrylate resin and 30 parts by weight styrene. This resinous mixture was combined with zinc stearate as a mold release agent, calcium carbonate filler, pigment pastes and t-butyl perbenzoate catalyst. The resulting mixture exhibited good shelf life in the absence of a catalyst and exhibited good catalyzed pot life after the catalyst was added.

An in-mold coated article was prepared in a mold comprising a 14"×14× flat sheet of glass fiber-reinforced polyester, ⅛" thick. The coating composition was introduced into the open mold in a sufficient quantity to provide a coating 3 mils thick. The mold was retained at 300° F. for 2 minutes.

The resulting product had a coating exhibiting:
pencil hardness=H;
Gardner gloss=35 (60° angle);
adhesion—good;
color—uniform.

EXAMPLE 2

A polyurethane polyacrylate was prepared by combining, as described in Example 1, the following ingredients:

1 mol toluene diisocyanate, a mixture of 2,4- and 2,6- isomers;
1 mol hydroxy ethyl acrylate;
0.5 mol polypropylene glycol, 1000 molecular weight.

70 parts by weight of the resulting polyurethane polyacrylate were mixed with 30 parts by weight styrene. The resulting styrene solution of polyurethane polyacrylate was combined with a dimethacrylate ester of the diglycidyl ether of bisphenol-A in a styrene solution. The resulting mixture contained 1 part by weight of the styrene solution and 1 part by weight of the dimethacrylate ester of the diglycidyl ether of bisphenol-A in 30 percent styrene. This resinous mixture was combined with catalysts and fillers and applied as a coating to the same 14"×14" molded article described in Example 1 at 300° for 2 minutes. The resulting coated article had:

hardness=F;
a gloss of 42 (60° angle);
adhesion—excellent.

We claim:

1. A method for producing a coated, molded, fiber-reinforced thermoset plastic article comprising
   producing a fiber-reinforced, thermoset plastic article in a matched metal mold;
   opening the said mold after the article has attained its intended shape;
   introducing into the open mold a single-component composition consisting essentially of:
   A. an alpha, beta ethylenically unsaturated monomer solution of a polyurethane polyacrylate which is the reaction product, substantially free of unreacted—NCO radicals of
      (1) an organic diisocyanate;
      (2) a hydroxy alkyl acrylate or methacrylate;
      (3) an organic diol, selected from the class consisting of alkylene diols, alkylene diol esters and polyesters; alkylene diol ethers and polyethers;
   B. a copolymerizable alpha-, beta-ethylenically unsaturated monomer solution of an acrylic or methacrylic ester of a diepoxide;
   C. an initiator for addition polymerization;
   D. fillers;
   closing the mold and thereby spreading the said composition over at least one surface of the said article;
   retaining the mold in the closed condition at a molding temperature sufficient to cause said article to cure further and cause said composition to cure by addition polymerization;
   opening the mold and recovering a molded, fiber-reinforced thermoset plastic article having an adherent coating over at least one surface thereof.

2. The method of claim 1 wherein the molar ratio of said organic diol to said hydroxy alkyl acrylate or methacrylate is 0.15 to 0.5 and the amount of said organic diisocyanate is sufficient to develop a NCO/OH ratio of 0.9 to 1.0 in the composition.

3. The method of claim 2 wherein the said organic diisocyanate is toluene diisocyanate.

4. The method of claim 2 wherein the said organic diol is a difunctional polyester of adipic acid and diethylene glycol.

5. The method of claim 2 wherein the said organic diol is polypropylene glycol.

6. The method of claim 1 wherein 0.075 to 5.0 parts by weight of the said polyurethane polyacrylate are provided for each part by weight of the said ethylenically unsaturated copolymerizable monomer solution.

* * * * *